(12) United States Patent
Peddada et al.

(10) Patent No.: US 11,728,974 B2
(45) Date of Patent: Aug. 15, 2023

(54) TENANT-BASED DATABASE ENCRYPTION

(71) Applicant: salesforce.com, inc., San Francisco, CA (US)

(72) Inventors: Prasad Peddada, Alameda, CA (US); Taher Elgamal, Atherton, CA (US)

(73) Assignee: Salesforce, Inc., San Francisco, CA (US)

( * ) Notice: Subject to any disclaimer, the term of this patent is extended or adjusted under 35 U.S.C. 154(b) by 247 days.

(21) Appl. No.: 17/162,766

(22) Filed: Jan. 29, 2021

(65) Prior Publication Data
US 2022/0247554 A1 Aug. 4, 2022

(51) Int. Cl.
*H04L 9/08* (2006.01)
*H04L 9/30* (2006.01)

(52) U.S. Cl.
CPC ............ *H04L 9/0825* (2013.01); *H04L 9/083* (2013.01); *H04L 9/085* (2013.01); *H04L 9/0841* (2013.01); *H04L 9/0894* (2013.01); *H04L 9/3066* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |

(Continued)

*Primary Examiner* — Bassam A Noaman
(74) *Attorney, Agent, or Firm* — Dergosits & Noah LLP; Todd A. Noah

(57) ABSTRACT

Methods and systems for securing customer data in a multi-tenant database environment are described. A security module running on a database server may generate a private key-public key pair in response to receiving a request to store client data in a database. The security module may then transmit a request to derive a symmetric key to a key server, the request including the generated public key. The key server may derive a symmetric key, using key agreement and a key derivation function, based on the received public key and a private key managed by the key server. The security module may then receive the symmetric key from the key server and encrypt the client data. To facilitate decryption, the public key used to generate the symmetric key and an identifier for the private key managed by the key server may be stored in metadata associated with the client data.

20 Claims, 12 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,369,443 B1 * | 6/2016 | Sinor .................... H04L 63/102 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0122875 A1 * | 5/2014 | Pizi .................... G06F 21/33 713/164 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0288514 A1 * | 10/2015 | Pahl .................... H04L 63/166 713/171 |
| 2016/0065370 A1 * | 3/2016 | Le Saint .................... H04L 9/14 713/155 |
| 2018/0373741 A1 * | 12/2018 | Martin .................... G06F 21/6218 |
| 2021/0281408 A1 * | 9/2021 | Liu .................... H04W 12/04 |
| 2022/0337427 A1 * | 10/2022 | Doiron .................... H04L 9/50 |

\* cited by examiner

TENANT-BASED DATABASE ENCRYPTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically relates to securing data transmitted over network connections.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

Conventional data security applications generally exist separately from the databases whose data they encrypt. Due to the need to encrypt the data for each tenant in a multi-tenant database using separate encryption keys, this leads to encryptions of portions of an overall table using different encryption keys. The corresponding encrypted data may be stored in extents on the database, with the data for multiple tenants being stored in the same extent. This can lead to limitations on database functionality. For example, data within the database table cannot be sorted, filtered, or indexed, since various portions of the table are encrypted within the table to preserve security. For a tenant to search their own data, it must be retrieved from the database, and decrypted first. Furthermore, fields in the database may not be sortable, since data in the database index table may be encrypted with different keys. For example, for columns such as last name, or date of birth, the encrypted data may not have a date format, and may likely be altered such that alphabetical sorting will be different with the encrypted data than it would be with unencrypted data.

BRIEF SUMMARY

Methods and systems for securing customer data in a multi-tenant database environment are described. A security module running on a database server may receive a request from a client application, over a network channel, to store data from a client device. The security module may generate a private key-public key pair associated with a tenant identifier in response to receiving the request to store data. The tenant identifier may have been generated when the organization made an initial request to store data at the database server, or may be generated in response to the request to store data. The security module may then transmit, over the network channel, a request to derive a symmetric key from a key server. The request for the symmetric key may include the public key associated with the tenant identifier. The public key associated with the tenant identifier may be stored in a data store otherwise inaccessible by the key server, thereby improving security by preventing a single system from having access to all the key material that may be used to derive the symmetric key.

The key server may derive the symmetric key using key agreement and a key derivation function from the public key associated with the tenant identifier and a private key managed by the key server. Similar to the public key associated with the tenant identifier, the private key managed by the key server may be accessible by the key server and not accessible by the database server. The security module may then receive the symmetric key from the key server via the network channel. The data received from the client device may then be encrypted, by the security module using the symmetric key and stored on the database server. To facilitate decryption, the public key associated with the tenant identifier and an identifier for the private key managed by the key server may be stored by the security module in metadata associated with the data encrypted using the symmetric key.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
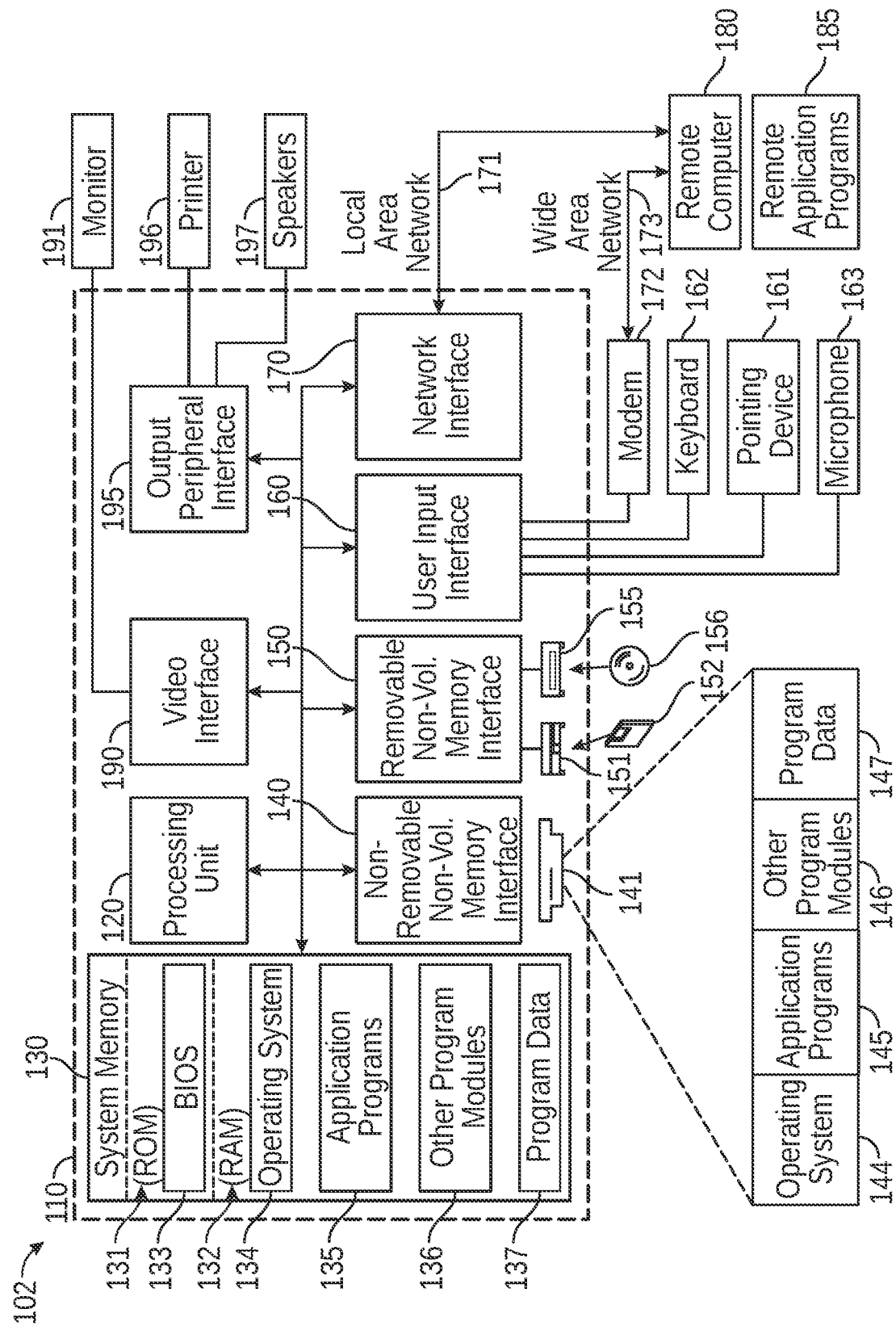
FIG. 1 shows a diagram of an example computing system that may be used with some embodiments of the present invention.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, a multi-tenant database environment may include multiple databases configured to store data associated with organizations or customers. The data (also referred to as customer data) may be unencrypted when it is stored by the customers. The customer data may be encrypted while it is at rest using asymmetric or symmetric cryptography. The encrypted customer data protects it from being accessed by any unauthorized users. While it may be important to encrypt the customer data, it may be desirable to secure the decryption key (private key or the symmetric key). The decryption key may be stored in a storage area that only certain authorized personnel can access (e.g., a security administrator). When the customer wants to retrieve the customer data, the encrypted customer data may be decrypted using the decryption key. The decrypted customer data may then be transmitted to the customer. The encrypted customer data may be stored in any storage area associated with the multi-tenant database environment, including cloud-based storage area, non-cloud-based storage area, or other forms of storage implementations.

One technique to protect a decryption key is to use a hardware security module (HSM). The HSM offers onboard secure key generation and onboard key storage and management. The HSM may be used to generate asymmetric or symmetric key pairs. The HSM may hold private keys in its storage such that the private keys cannot be extracted by external parties. A password may be required to use an HSM that is installed in a system. The HSM may be a Universal Serial Bus (USB) device connected via a USB port, or it may be a card device installed via a system board, or it could be a network attached device.

Conventional systems for securing customer data may perform encryption at the customer side, separately from a database server. The customer may manage their data using a client application, in communication with an application server. The application server may be used to perform encryption/decryption of data, which it may then store in a data store, such as a database on a database server. Such approaches may have several disadvantages, particularly in a multi-tenant setting. First, conventional databases may include tables, where data for multiple tenants is stored in different columns of the table. When encryption is utilized, this means that different columns of the table may be encrypted using different encryption keys (since doing otherwise would jeopardize the security of all tenants if one tenant were compromised). Since different columns are encrypted differently, basic database functionality such as searching, filtering, or indexing data are rendered impossible. This even applies to data from an individual tenant, since different keys may be used to encrypt the tenant's data (even in the same table). Furthermore, column-based encryption may necessitate use of the separate application server, creating additional points of failure, as the application server is needed to access tenant data on the database, and the application server has possession of the encryption key (which often requires key data from the client application, creating yet another level of complexity and potential failure).

The disclosed embodiments may be related to encrypting and decrypting or securing customer data in a computer-implemented system. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Computer System

FIG. 1 is a diagram of an example computing system that may be used with some embodiments of the present invention. The computing system 102 may be used by a customer or an organization to transmit customer data to be stored in a storage area associated with a multi-tenant database environment. For example, the multi-tenant database environment may be associated with the services provided by Salesforce.com®. The computing system 102 may also be used to retrieve the customer data from the storage area.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Network

Figure 2:
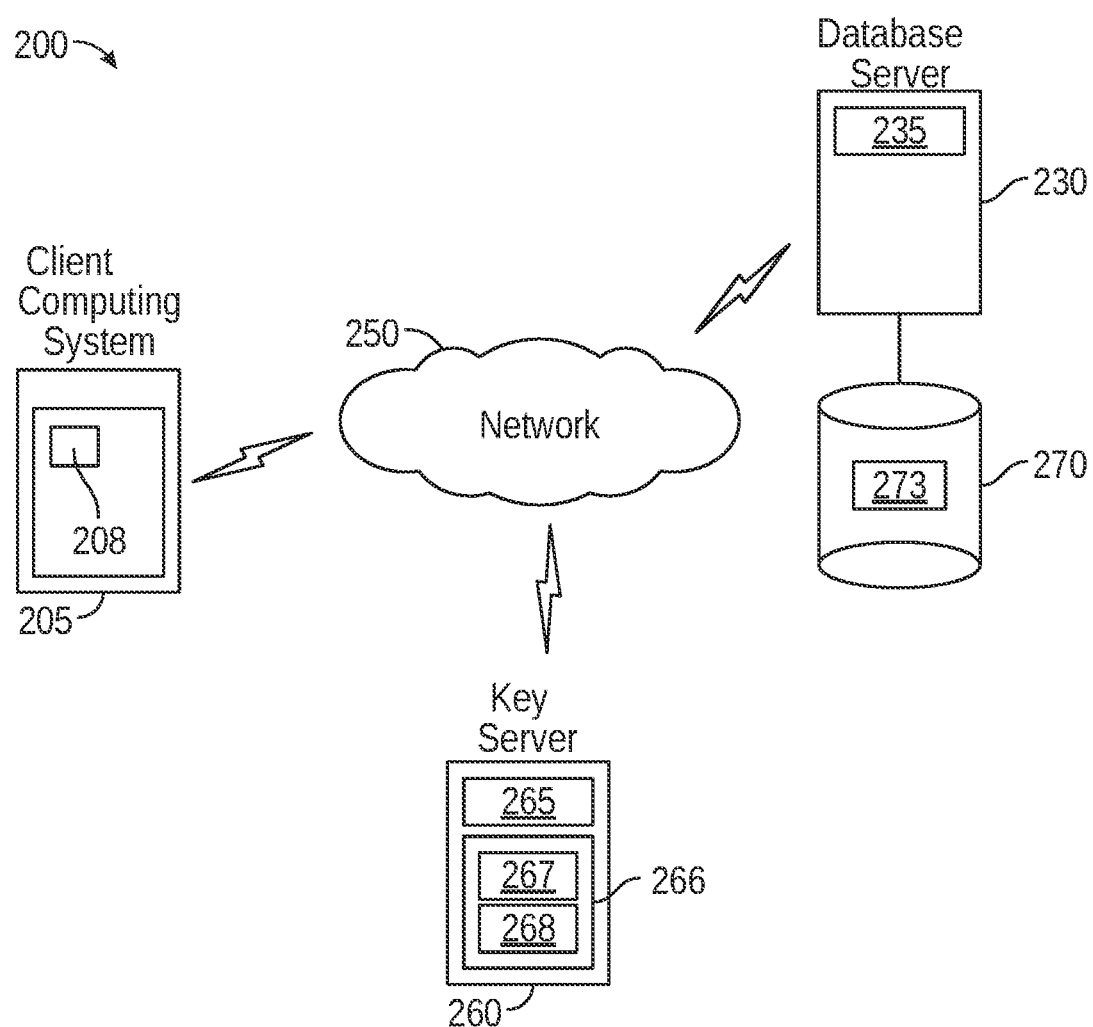
FIG. 2 shows a diagram of an example network environment that may be used with some embodiments of the present invention.

FIG. 2 shows a diagram of an example network environment that may be used with some embodiments of the present invention. Network environment 200 includes computing system 205, which may be a mobile computing system. The computing system 205 may be connected to the network 250 via a cellular connection or via a Wi-Fi router (not shown). The network 250 may be the Internet. The computing system 205 may be coupled with one or more server computing systems 230 and 260 via the network 250.

The database server 230 may be in communication with a plurality of customer devices over network 250. Each client computing system, similarly to computing system 205, may be associated with a client and may include client application module 208. A user may use the client computing system 205 and the client application module 208 to connect to and communicate with the server computing system 230 (also referred to as the database server) and log into security module 235 (which may be an application running on the database server 230 that facilitates the encryption and decryption steps described herein). The user may transmit client data to the database server 230 and may make subsequent requests for the client data from the database server 230.

The database server 230 may store database 270, which may store client data for multiple clients. The database server 230 may be associated with an entity (e.g., Salesforce.com®). The entity may generate a key pair for generating a symmetric key used to encrypting client data or non-client data (such as system data). The key pair may include a public key 273 and a private key (not shown). The private key may generally not be available publicly, but kept secret by the entity (also referred to as the key holder). In some embodiments, the private key may be destroyed after creation, since it is not needed to generate asymmetric key via key agreement. The public key 273 may be made available to anyone by means of a digital certificate issued by a certificate authority (CA). The certificate may also be a confirmation or validation by the CA that the public key contained in the certificate belongs to the entity noted in the certificate. For example, a customer can download the certificate and get the public key 273 used to create a symmetric key, which is subsequently used to encrypt the customer data transmitted to the database server 230.

The database server 230 may be coupled with the key server computing system 260 (also referred to as the HSM server) configured with an HSM 266. The HSM 266 may be associated with an HSM public key 267 and an HSM private key 268. The key server 260 may include HSM application module 265 configured to interact with the HSM 266 and to perform various cryptographic operations. For example, the HSM application module 265 may, in a Rivest-Shamir-Adleman (RSA) encryption scheme, for example, use the HSM private key 268 to generate a symmetric key for decrypting data previously encrypted using the corresponding HSM public key 267. A password may be required to access the HSM 266. For load balancing purposes, there may be multiple database servers 230 and multiple key servers 260 connected to a load balancer (not shown). All the database servers 230 may need to know which key servers 260 they can communicate with at any particular time.

Symmetric Key Creation

Figure 3:
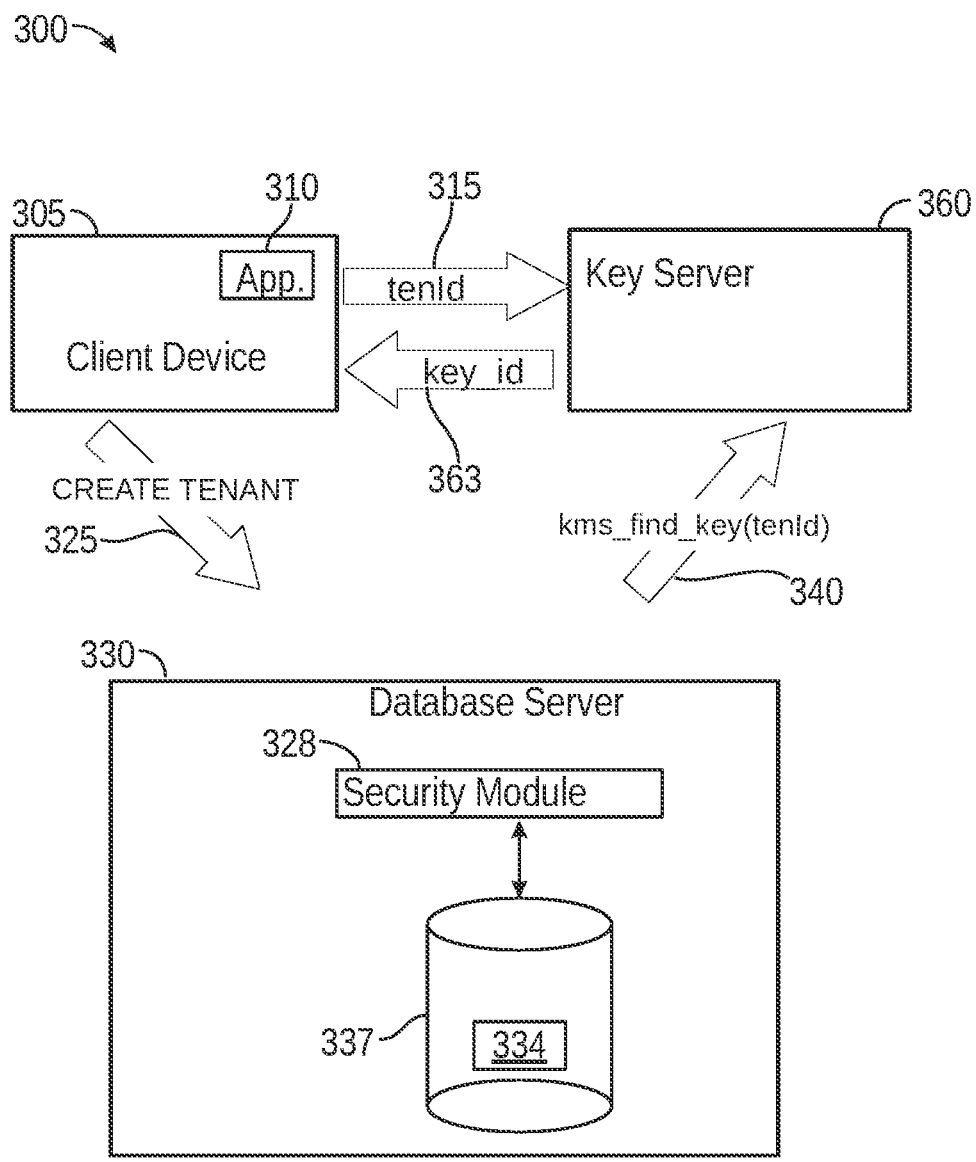
FIG. 3 shows an exemplary block diagram illustrating generation of a symmetric key, in accordance with some embodiments.

FIG. 3 illustrates an example of generating a symmetric key for a customer, in accordance with some embodiments. During operation, the client device 305 running client application 310 may call a function to create a new key for an organization that wishes to store client data on the database server 330. The function may transmit a tenant identifier tenId 315 to the key server 360. The tenant identifier tenId 315 may be created by the client application 310 in some embodiments, or it may be received from the database server 330 in response to an earlier request by the client application 310. In an exemplary embodiment, in addition to the tenant identifier tenId 315, the client application 310 may transmit an access control list, which may include backend daemons of the database server 330, and any APIs used by the security module to access the private key (for example, kms_find_key( ), described below). The client application 310 may also transmit replication targets, which contain the client data a user wishes to store on the database server 330. This may include, in addition to production database data, any backup database data utilized by the customer.

In response to receiving the tenant identifier, the key server 360 may transmit an identifier 363 for a private key 365 managed by the key server 360. The identifier may include at least one of a key identifier, key_id, and a version identifier, version_id, to specify a current version of the private key being assigned to the client application. Each tenant identifier may be mapped to a key identifier 363, in an exemplary embodiment, and the key identifier key_id may have multiple versions, identified by the version identifier version_Id. The version identifier may be significantly smaller than the key identifier, which may increase the efficiency of network communications. For example, the security module may only need to include a version identifier from identifier 363 in a request to generate a symmetric key, improving efficiency. The key identifier may be assigned by the key server 360 and may use any suitable mapping (e.g., using a number that is incremented for each private key created by the key server 360). As described below, the identifier 363 may also be transmitted to the database server 330 in response to a request to derive a symmetric key. The identifier 363 may be stored in metadata associated with the customer data, where it may be retrieved for subsequent requests to regenerate the symmetric key.

The customer may then sign up with the database server 330 for storing customer data on the database server 330. To sign up, the client application 310 may then call a function, such as a "Create Tenant" function 325 to request that the database server 330 create a symmetric key for encrypting data from the client device 305. In response to receiving the request via the Create Tenant Function 325, security module 328 of the database server 330 may request the symmetric key from the key server 360. This may be done, as seen in the exemplary embodiment, by the security module 328 calling a function such as kms_find_key( ) 340, and including the tenant identifier tenId 315. The tenant identifier tenId 315 may be passed to the database server 330 as part of the Create Tenant function 325 request for a symmetric key, or subsequently, in a separate querying process by the security module 328.

In response to receiving the request for a symmetric key via the kms_find_key( ) function 340, the key server 360 may identify the private key corresponding to version_id, and use it to generate the symmetric key. In some embodiments, this may include using a public key generated by the security module 328 and transmitted with the tenant identifier tenId 315 to generate a symmetric key using key agreement and a key derivation function. Further details of the key generation are described below. The process described in FIG. 3 advantageously may not require any exchange of actual key material between the client application 310 and the database server 330, thereby removing a potential security risk compared to conventional systems (which may require a client application public key to be passed to the security module 328).

The security module 328 may then use the symmetric key, which may be unique to the organization associated with the client device 305, to encrypt data from the client device 305. The encrypted data 334 may then be stored in the database 337 stored on the database server 330. Subsequently, when the client device 305 requests the encrypted data, the encrypted data may be retrieved from the database 337, decrypted by the security module 328 using a regenerated symmetric key, and the decrypted customer data may be transmitted to the client device 305 over the network. In some embodiments, the symmetric key may be assigned to the client device by being associated with the tenant identifier by the security module. The database server and security module may provide secure storage for a plurality of different customers, where each customer is a tenant in a multi-tenant database. By storing the association between the symmetric key and the tenant identifier, which may be done simply by associating the public key used to generate the symmetric key and the identifier of the private key managed by the key server with the tenant identifier. The security module may use this stored association to generate regenerated symmetric keys to encrypt subsequent data received from the client device.

Figure 4:
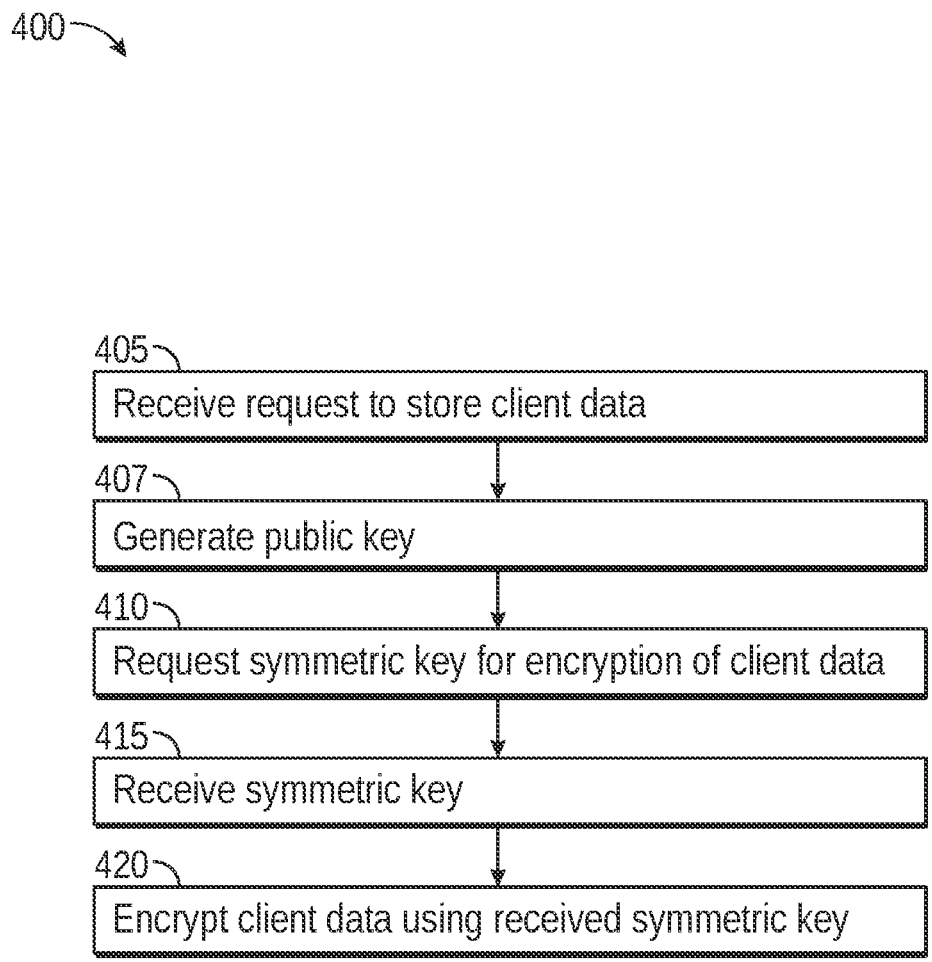
FIG. 4 shows a flowchart of an example process for encrypting tenant data using asymmetric key generated using key agreement, performed in accordance with some embodiments.

FIG. 4 shows a specific embodiment of a flow diagram for a method 400 for encrypting tenant data using a symmetric key generated using key agreement. The process 400 may be performed by a security module 328 (shown in FIG. 3) in communication with a client application 310 and the key server 360. At step 405, a request may be received by a security module (e.g., security module 328) running on a database server, over a network channel from a client application (e.g., client application 310), to store data from a client device. The security module may generate a private key-public key pair associated with a tenant identifier in response to receiving the request to store data at step 407. The public key associated with the tenant identifier is used to generate the symmetric key—while the private key is not used in some embodiments, and may be discarded by the security module after it is generated at step 407. The tenant identifier may have been generated when the organization made an initial request to store data at the database server or may be generated in response to the request to store data.

The security module may then transmit, over the network channel, a request to derive a symmetric key from a key server at step 410. The request for the symmetric key may include both the tenant identifier and the public key associated with the tenant identifier. The public key associated with the tenant identifier may be stored in a data store otherwise inaccessible by the key server, thereby improving security by preventing a single system from having access to key material for generating the symmetric key.

The key server may derive the symmetric key using key agreement and a key derivation function using the public key associated with the tenant identifier and a private key managed by the key server using a key agreement protocol. Similar to the public key associated with the tenant identifier, the private key managed by the key server may be accessible by the key server and not accessible by the database server. The private key may, in an embodiment, be retrieved from a key management service in communication with the key server. The key management service may store a plurality of private keys (in an HSM, for example, or storage under the control of the key management service) linked to a plurality of key identifiers provided to the security server. The key management service may take the form of an HSM that secures all private keys included therein, which may be in communication with the key server over a network connection. In an exemplary embodiment, each customer may be associated with a different private key managed by the key server. Such embodiments may advantageously provide even greater security, as each customer may already be associated with a different public key associated with its unique tenant identifier, and having two distinct keys, each unique to a customer, may make it more difficult to compromise the security of the customer's symmetric key.

Alternatively, the key management service may split the private keys among a plurality of key servers, where secret sharing multi-party computations only allows a subset of the key servers (including a key management service server) to perform cryptographic computations that effectively allow access to the private keys from the locations where the key shares are stored, without actually assembling the private keys on the key servers. Such embodiments may provide additional security, by not storing the private keys on the key server, and only providing them upon request. Alternatively, the storage location may be a data store within the key server.

The private key managed by the key server may be selected by the key server in several different ways. In an exemplary embodiment, the private key may have been previously assigned to the tenant identifier in a previous transaction (e.g., via identifier 363, described above). In such embodiments, the request to derive the symmetric key may include the tenant identifier, which the key server may use to retrieve the private key managed by the key server. In another embodiment, before writing an extent, the database server may call into the key server to reserve a private key for a customer associated with a particular tenant identifier. The key server may respond to this call to reserve a private key by creating an asymmetric key pair managed by the key server, which includes the private key managed by the key server. The key server may then return, to the database server in response to the call to reserve the private key, an identifier for the private key managed by the key server (which may be substantially the same as identifier 363. The identifier for the private key may be a public key identifier for a public key associated with the private key managed by the key server. Alternatively, the key server may return the public key associated with the private key managed by the key server itself as the identifier for the private key. Either the public key identifier or the public key may then be stored by the database server as metadata associated with the encrypted customer data. Such embodiments may advantageously not require the key server to track the tenant identifier, since the database server may simply include the public key identifier or the public key associated with the private key managed by the key server to derive regenerated symmetric keys.

To generate the symmetric key, a key agreement key may be generated first. Any suitable key agreement protocol may be used to generate a key agreement key from the public key associated with the tenant identifier and the private key managed by the key server, including an elliptic curve Diffie-Hellman (ECDH) key exchange, anonymous key exchange, etc. In an exemplary embodiment, the key agreement protocol may be based on the elliptic curve function common to the generation of the public key associated with the tenant identifier and the private key managed by the key server. The public key associated with the tenant identifier and the private key managed by the key server is derived from the same elliptic curve (despite being from distinct elliptic curve key pairs corresponding to different points on the elliptic curve), and any suitable ECDH key agreement function may be applied to the public key and the private key associated with the key identifier.

The symmetric key may then be generated by the key server by applying a key derivation function to the key agreement key. The key derivation function may be a suitable cryptographic hash function that creates the symmetric key based on the key agreement key and a salt value to derive the symmetric key. Exemplary key derivation functions that may be used include HKDF, PBKDF2, bcrypt, scrypt, and the like. The salt value may be a randomly-generated value used to generate each symmetric key, where a different salt numeric value or string may be used for each symmetric key request. The salt value generally has enough bits to be unique among a potentially large number of clients, wherein having more bits increases security, but also increases the complexity (and potentially time delay) of generating the symmetric key. The salt value may be generated by the security module and transmitted with the request to generate the symmetric key in some embodiments. The salt value may be a random number, or may be derived from customer data (e.g., from some mathematical combination of the keyId value and the tenant identifier). In such embodiments, the security module may store the salt value (in metadata, for example) such that it is associated with the public key associated with the tenant identifier. Alternatively, the salt value may be generated by the key server in some embodiments, where it may be stored and associated with the private key associated with the key identifier.

The security module may then receive the symmetric key from the key server via the network channel at step 415. The data received from the client device may then be encrypted, by the security module using the symmetric key at step 420, and stored on the database server. In an exemplary embodiment, encryption and decryption may take place in parallel, using 16-byte units. In the exemplary embodiment, flusher, merger, and other commands may borrow block cache for I/O operations, although encrypted data may not be left in the block cache. The encrypted customer data is protected from being accessed by any unauthorized users, as possession of the symmetric key is needed to decrypt the customer data. To provide further protection against data tampering, an additional security measure, such as storing a customer-specific digital signature, or a media access control (MAC) address of a device (such as a client device), may be stored in the encrypted data. In embodiments where compression is used, the compression operation may be performed before encryption of the fragment. After the fragment has been encrypted using the symmetric key by the security module, a cyclic redundancy check value may be determined for the encrypted fragment, before the encrypted fragment is written to the database.

To facilitate decryption, the public key associated with the tenant identifier and an identifier for the private key managed by the key server may be stored by the security module in metadata associated with the data encrypted using the symmetric key. The identifier for the private key may be, for example, a public key associated with the private key used to generate the symmetric key, or a public key identifier associated with the public key associated with the private key used to generate the symmetric key, as described above. To perform the encryption (and, similarly, decryption, as discussed below), the security module receives a fragment payload, the symmetric key, and an initialization vector. The initialization vector may advantageously provide randomness to each encrypted block by being a unique value derived from information within the fragment being encoded or decoded. In an exemplary embodiment, the initialization vector may be based on a different feature, depending on the size of the data being encrypted. For extents, either an extent number or a random number may be used as an eight-byte initialization vector. For fragments, a fragment number may be used as a four-byte initialization vector. For blocks, which may be 16-byte units (the smallest unit for encryption purposes), a block counter may be used as a four-byte initialization vector.

Compared to conventional data protection schemes, the method 400 advantageously does not require persisting of a private key data either on the database server or the key server (for embodiments where the private key associated managed by the key server is stored on an HSM or other external storage), thereby improving security by not comprising the symmetric key if either the database server or the key server are compromised. Not only is security improved by not persisting private keys, method 400 also reduces the amount of cache needed, as conventional systems require persisting of private keys in cache memory, which can be resource intensive in a multi-tenant environment. Only the public keys used to generate the symmetric keys are required to re-generate a symmetric key after the symmetric key is removed from the cache. In some embodiments, the private key used by the security module to generate the public key may be disposed of to conserve memory resources. Finally, method 400 represents a different use of key agreement than conventional usages. Where conventionally, key agreement is generally used to secure communications between two devices, method 400 uses key agreement to securely generate a symmetric key to encrypt data from third-party client devices, which do not directly generate or use the symmetric key. As noted above, no single party can compromise the symmetric key generated using method 400, providing unique benefits for multi-tenant application servers to secure customer data.

Furthermore, conventional multi-tenant database systems intermingle tenant data within the same tables/fragments within the database. Method 400 advantageously resolves this issue by having a single designated symmetric key for each tenant, and keeping fragments separately stored and encrypted within each extent in the database. This allows basic database functionality, such as searches, filtering, or indexing, to function properly within each fragment, since the data within the fragment has been encrypted using the same symmetric key.

Figure 5:
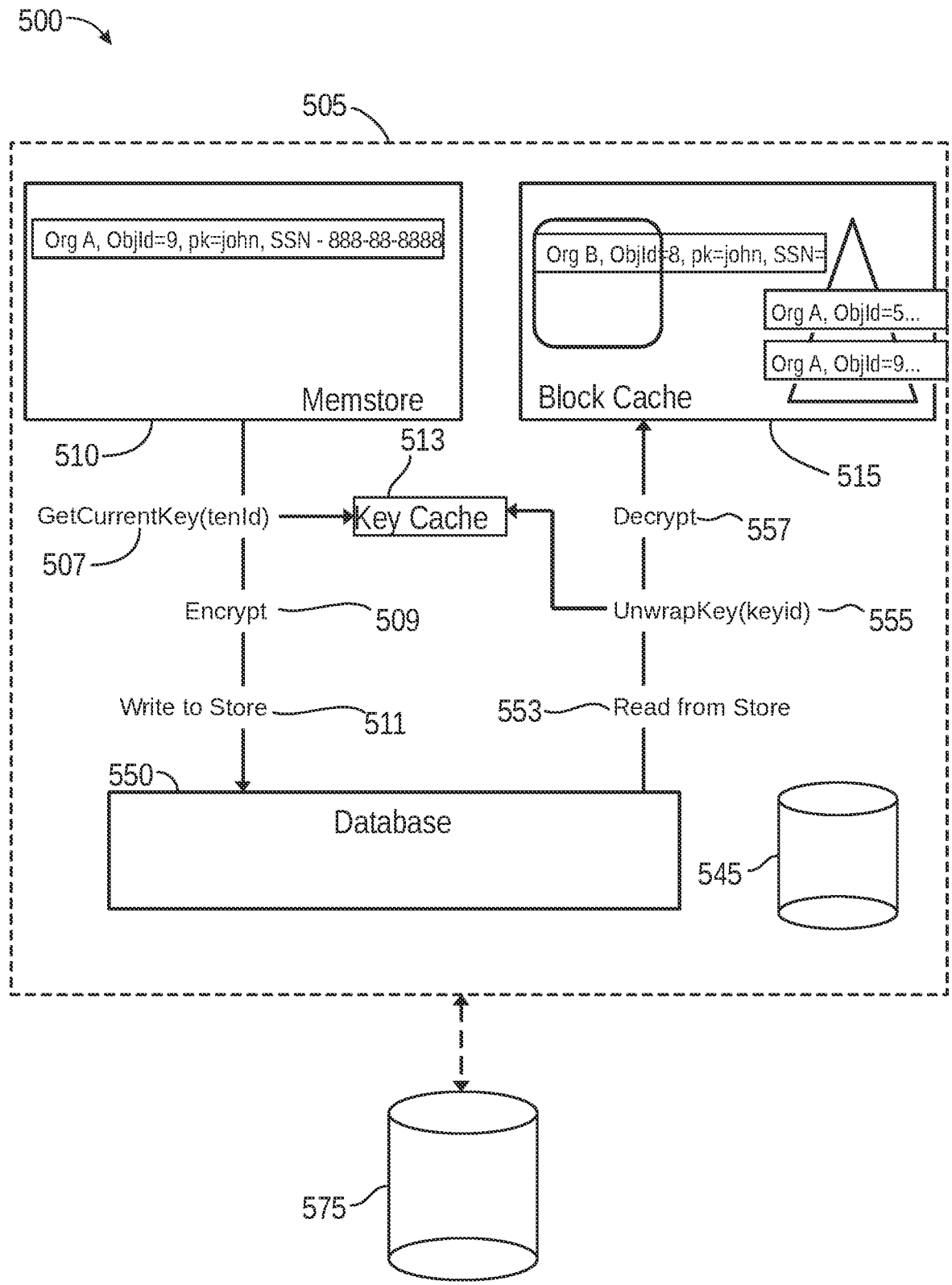
FIG. 5 shows an exemplary block diagram of a database server and security module, in accordance with various embodiments.

FIG. 5 shows an exemplary block diagram 500 of a database server and security module, in accordance with various embodiments. System 500 may be a more detailed diagram of the database server 330 from FIG. 3. As seen in system 500, the database server 505 may include memstore 510, which may include information regarding each of plurality of customers, block cache 515, key cache 513, local disk 545, and database 550. Upon receiving the request 507 to encrypt data, the security module may encrypt the client data at block 509 and write the encrypted data to the database 550 at block 511. The key cache 513 stores the symmetric keys used for encryption and decryption. In some embodiments, key cache 513 may be cleared after encryption/decryption operations to destroy the symmetric key after encryption/decryption, to maintain key security for customers if for some reason the database server 505 is compromised. The symmetric key used to encrypt the client data may be retrieved from key cache 513 if it was requested in an earlier transaction, or a regenerated symmetric key may be requested from the key server 575 over a network channel, as detailed in method 400, if the symmetric key is not found in the key cache 513. All data server backends/daemons can communicate with the key server 575 before every input or output, in an exemplary embodiment.

Likewise, when client data is requested, the security module may read the requested data from the database 550 at block 553. The reading may include extracting metadata associated with the client data, which may include the public key used to generate the symmetric key, and an identifier of the private key used to generate the symmetric key. A duplicate of the symmetric key may then be requested at block 555 to decrypt the requested data. This may be performed, for example, using a function such as UnwrapKey( ), with the keyid being the identifier of the private key. If the duplicate symmetric key has been generated (e.g., using the process described below in FIG. 8), then the duplicate symmetric key is retrieved from the key cache 513; otherwise the duplicate symmetric key is requested from the key server 575. At block 557 the duplicate symmetric key is used to decrypt the requested client data. The decrypted data may then be stored in the block cache 515.

Figure 6:
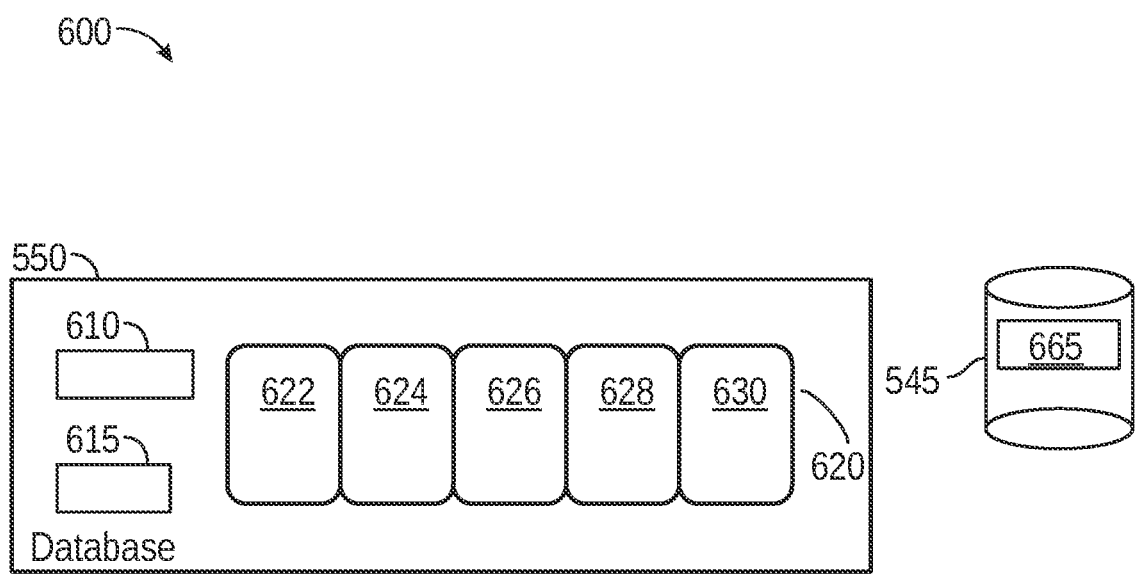
FIG. 6 shows an exemplary block diagram of a database on a database server, in accordance with various embodiments.

FIG. 6 shows a simplified block diagram 600 of a database 550 on a database server, in accordance with various embodiments. Diagram 600 includes tenant aware database 550, which may correspond to database 550 stored on the data server 505 in FIG. 5, and local disk 545. The database 550 includes transaction logs 610, storage catalog 615, and data extent 620, each of which may utilize encryption for security purposes in different ways. As shown in diagram 600, the data extent 620 includes a plurality of data fragments. Data fragment 622 includes non-tenanted data, while fragments 624 and 626 are client device data encrypted using a symmetric key associated with a customer named "Tenant A." Fragment 628 is client device data for a different customer, named "Tenant B," and encrypted using a different symmetric key. Finally, fragment 630 includes cross-tenanted data, in the form of a block index. While data from multiple customers may be encrypted in a single data extent, as shown in FIG. 6, other embodiments may include data from only a single tenant in an extent, to further facilitate searching the customer data by decrypting the data with a single duplicate symmetric key. Each tenant in such embodiments may have data stored in distinct extents, where the fragments of each extent are encrypted using the same symmetric key.

As stated above, different symmetric keys may be used to encrypt the data in the database 550. Customer data may be encrypted using the corresponding symmetric keys. Cross-tenanted data, meaning data that indexes or organizes data for multiple customers, may be encrypted using a system key. Examples of cross-tenanted data may include block index 630, transaction logs 610, and storage catalog 615. Non-tenanted data, such as data fragment 622 (which may include data about the data extent itself, or data relating to the database 550), may also be encrypted using the same system key as the cross-tenanted data, or using a separate key. System keys may be generated by the security module of the database server 550, using a private-public key pair generated by the security module. The public key of the system key private-public key pair may be transmitted to a key server, as described above, to generate a symmetric key specific to the database server 550, which may be used to encrypt and protect the database data as described above.

As stated above, metadata for each fragment may be used to store information about the symmetric key used to encrypt the fragment. This information may include the public key associated with the tenant identifier, and the private key (including the version identifier) managed by the key server, both of which were used to derive the symmetric key for the fragment. The information may be stored in a header for each fragment, simplifying the identification of the information during decryption. Similarly, the catalog may also store the public and private key information in a fragment header. The headers may take the form, for example, of a new secondary fragment header that includes the version identifier of the private key used to derive the symmetric key (e.g., 16 bytes), the extent random number (e.g., 8 bytes), and 1 byte for the version. The extent number may be replicated in every fragment because certain read code paths may only have access to the fragment, not the extent to which the fragment belongs. By contrast, since transaction logs are all encrypted using the system symmetric key and are comparatively smaller than data fragments, the public key and private key identifier for the log fragments may be stored within the log extent, in an xlink log record, for example. This secondary header information described above in the exemplary embodiment may be stored in the xlink log record for log fragments.

Local disk 545 may include "temp spills" 665, which are defined as client data that may exceed an extent's capacity, which may be stored on local disk 545 until another extent is created for the client whose data has spilled over into temp spills data 565. The temp spills data 665 can be encrypted with a separate symmetric key, also managed by the security module, known as a volume symmetric key. The volume symmetric key may be used to encrypt all data on the local disk 545, and may be managed by the security module similarly to the system keys, described above. The security module may generate a private-public key pair and transmit the public key to the key server. The key server may use a key derivation function on a key agreement key derived from the received public key of the volume key public-private key pair and another private key managed by the key server to generate the volume symmetric key. The volume symmetric key may then be transmitted to the database server, where it may be used by the security module to encrypt data stored on the local disk.

Figure 7:
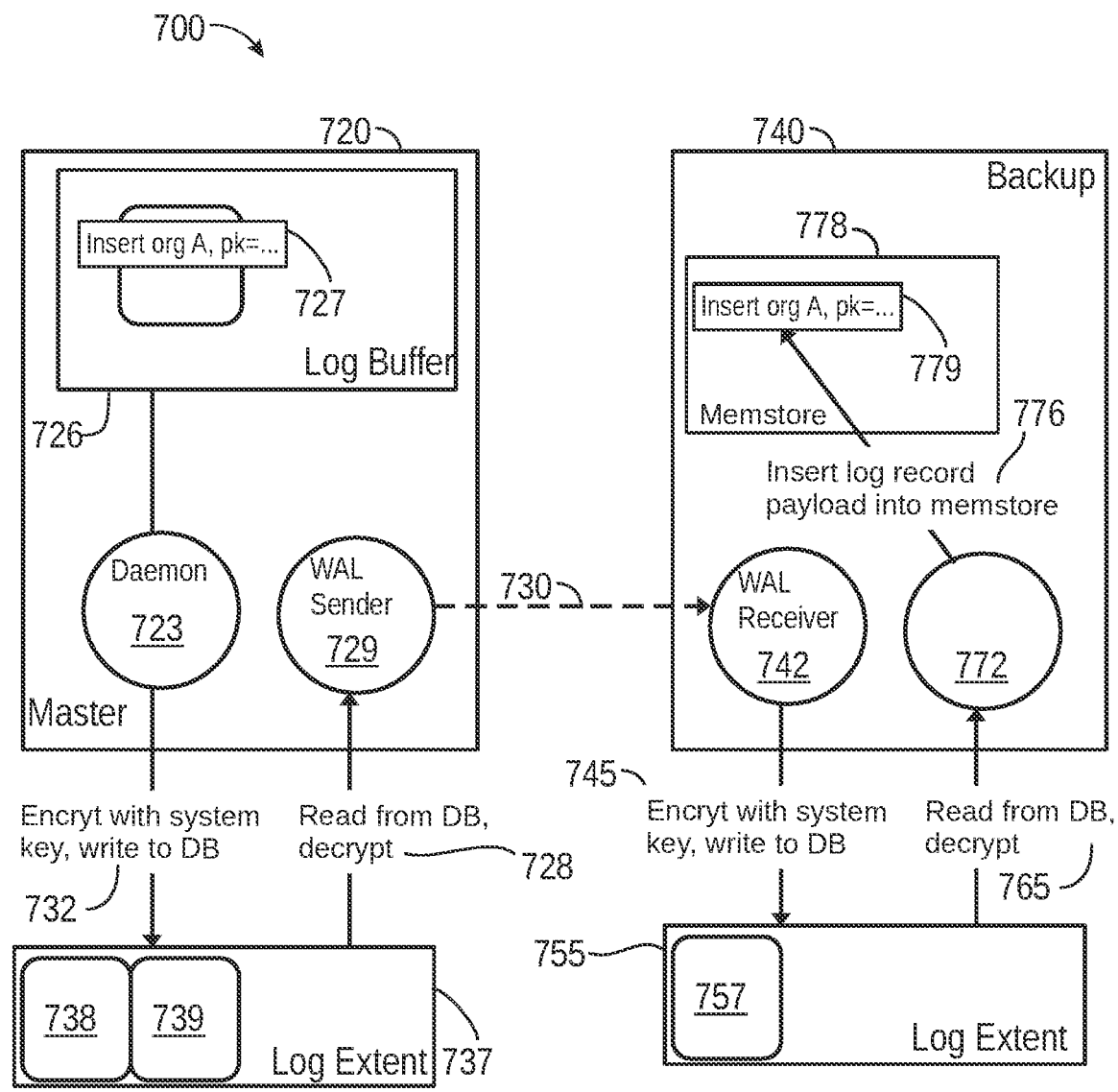
FIG. 7 shows an exemplary block diagram of transaction log data structure, in accordance with various embodiments.

FIG. 7 shows an exemplary block diagram of transaction log system 700, in accordance with various embodiments. Transaction log data structure 700 is an exemplary embodiment of the transactions logs block 610 in FIG. 6, and may include master log system 720 and backup log system 740, which are in communication over network connection 730. The master log system 720 and the backup log system 740 may each also be in communication with the databases within their respective servers, which may include the extents shown in transactions log system 700. Master log system 720 logs all storage transactions with the database using a daemon 723 (which may be referred to as a backend or log daemon). These transactions may be logged in log buffer 726, which in the exemplary embodiment includes exemplary transaction 727. As seen in transaction 727, each transaction may include the organization associated with the transaction (as transaction logs are examples of cross-tenanted data, as described above). After the daemon 723 has logged transactions in the log buffer 726, the daemon 723 may forward the logged transactions to the security module, which may encrypt the transactions using a system key, as described above, in block 732. The encrypted transactions may then be stored in log extent 737. Log extent 737 may include log fragments 738 and 739, each being encrypted with the system key being currently used by the security module, and may be located in a database of a database server (e.g., database 550).

In addition to the foregoing, the master log system 720 may also provide backup log system 740 (also known as a data recovery, or "DR" log) with copies of the logged transactions, to maintain a complete and current backup to the log stored in the database 760 by the master log system 720. As shown in FIG. 7, this may be done by write-ahead logging ("WAL") sender 729. At block 728, the security module may decrypt and read log fragments from the log extent 737. After being decrypted, the WAL sender 729 may transmit the unencrypted transactions to the backup log system 740 over the network connection 730 (e.g., using the SSL protocol). Within the backup log system 740, the WAL receiver 742 may receive the unencrypted transactions, encrypt the received transactions with another system key, and write the encrypted transactions to backup log fragment 757 within log extent 755, which may be stored in a second database. The log fragments in log extent 737 and log extent 755 may be encrypted with different system keys, which may be derived separately using the procedures described above in conjunction with a key server.

In the event a transaction log needs to be reconstructed by the backup log system 740, a redo agent 772 may read backup log fragments from backup log extent 755 at block 765. The redo agent 772 may then insert the log record payload into a backup log memstore 778 at block 776. As shown in memstore 778, this means, for example, that a duplicate 779 of transaction 727 may be created for purposes of recreating the transaction log.

Figure 8:
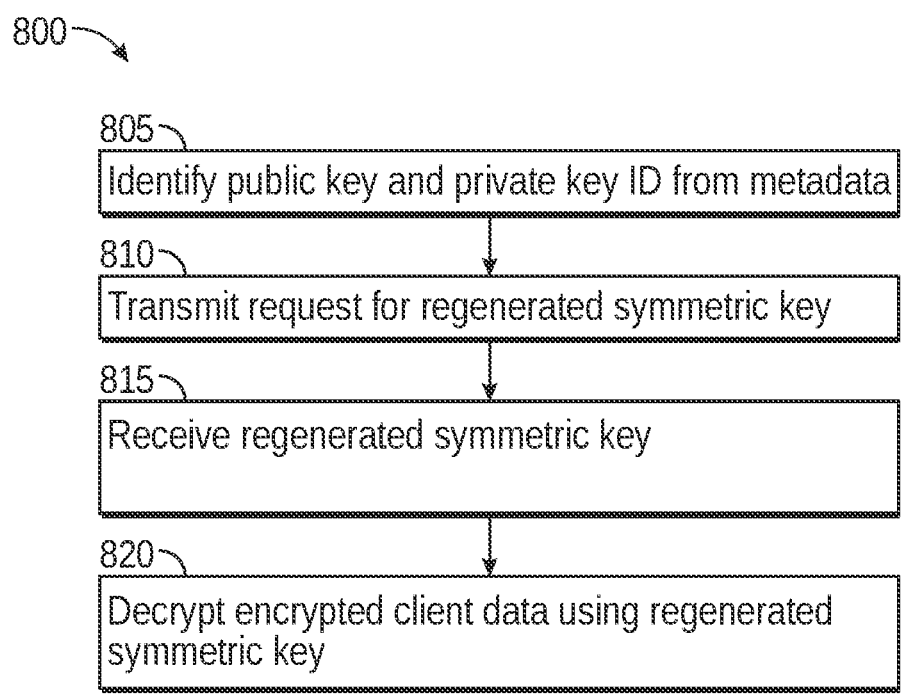
FIG. 8 shows a flowchart of an example process for decrypting tenant data using a duplicate symmetric key using key agreement, performed in accordance with some embodiments.

When a customer wishes to retrieve data from the database, a duplicate symmetric key is generated and used to decrypt the data. FIG. 8 shows a flowchart of an example process 800 for decrypting tenant data using a duplicate symmetric key using key agreement, performed in accordance with some embodiments. At step 805, in response to a request to decrypt client data specified by the request, the security module may identify both the public key associated with the tenant identifier and the identifier for the private key managed by the key server from the metadata associated with the client data specified by the request. Once the public key associated with the tenant identifier and the identifier for the private key managed by the key server are identified by the security module, a request may be transmitted over the network channel to the key server for a duplicate symmetric key at step 810. The request for the symmetric key may include the public key associated with the tenant identifier and the identifier for the private key managed by the key server from the metadata.

The request may be received by the key server, which may then retrieve the private key identified by the identifier included in the request for the duplicate symmetric key (e.g., from a HSM, or from a key management service). Once the private key has been retrieved, key agreement may be used to derive the regenerated symmetric key, as described above, from the public key associated with the tenant identifier and the retrieved private key, using key agreement and the same key derivation function used to generate the symmetric key. The key server may then transmit the duplicate symmetric key to the security module which may receive the duplicate at step 815.

The security module may then use the duplicate symmetric key to decrypt the encrypted client data at step 820, as shown in FIG. 5. In embodiments where compression is used, the decompression operation may be performed after both the CRC value of the encrypted fragment has been verified to match the expected value and decryption has been performed. The decrypted (and decompressed) client data may then be sent to the client device over the network channel, as a response to the request for the client data from the database.

Over time, it may be a good practice for customers to rotate the keys used to encrypt their data (i.e., use a different symmetric key to encrypt their data), to provide more security for the encrypted data. To do so, the database server may simply send a new request to the key server for a different symmetric key that includes a reference to the private key used to create the original symmetric key (e.g., the public key associated with the private key used to create the original symmetric key, a public key identifier for the public key associated with the private key used to create the original symmetric key, the tenant identifier, etc.) and a different public key. This request to rotate the symmetric keys for a specific customer may be initiated by the customer, by an administrator of the security module, or automatically by the security module (e.g., after a predetermined period of time) in various embodiments. In an exemplary embodiment, the key rotation may be triggered by the security module using a command, such as "ALTER TENANT <tenant id> REFRESH KEY.

In an exemplary embodiment, the security module may transmit a request to rotate the symmetric key to the key server. Since changing only one of the keys used in key agreement process will result in a different symmetric key being generated, various approaches may be used to rotate the symmetric key. For example, the security module may generate a new public-private key pair associated with the tenant identifier, and transmit the new public key with the request to rotate the symmetric key, where it may be used to generate a rotated symmetric key (e.g., with the same private key used to generate the original symmetric key). Alternatively, the security module may transmit the request without using a different public key associated with the tenant identifier. Instead, the key server may select a different private key, and use key agreement with the received public key associated with the tenant identifier to generate a rotated symmetric key. In yet another embodiment, both a new public key associated with the tenant identifier and a different private key (from the private key used to generate the original symmetric key) may be used to generate the rotated symmetric key.

Sandbox copies, or duplicate copies of database data, of data extents may be generated in some embodiments. In some embodiments, sandbox copies may use the same symmetric key used to encrypt the original customer data extents, or may use a regenerated symmetric key using the public key associated with the tenant identifier and the private key. In an exemplary embodiment, when generating sandbox copies of extents, the customer extents may be decrypted using a regenerated symmetric key, copied, and then re-encrypted using another regenerated symmetric key.

On-Demand Service Environment

Figure 9A:
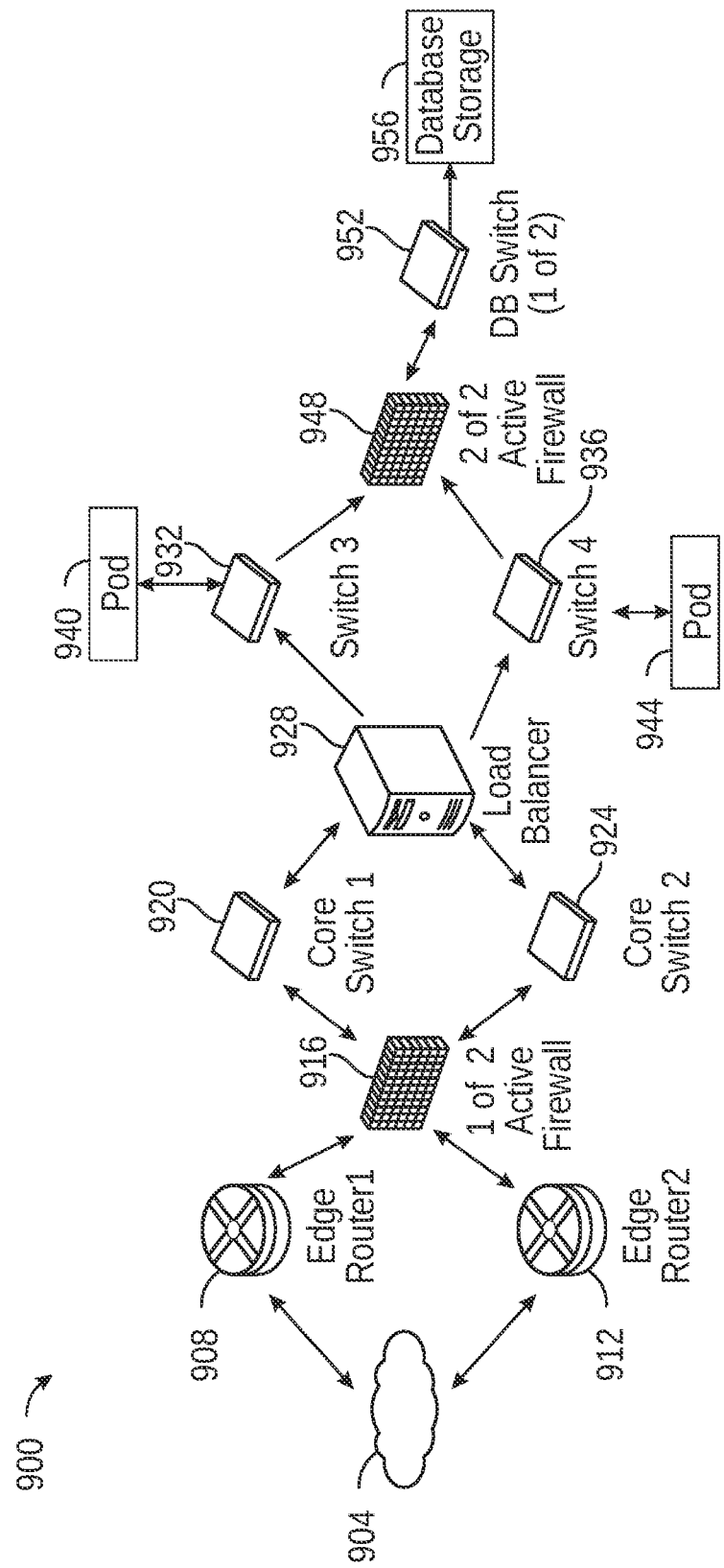
FIG. 9A shows a system diagram illustrating architectural components of an applicable environment, in accordance with some embodiments.

FIG. 9A shows a system diagram 900 illustrating architectural components of an on-demand service environment, in accordance with some embodiments. A client machine located in the cloud 904 (or Internet) may communicate with the on-demand service environment via one or more edge routers 908 and 912. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand service environment may communicate with a database storage system 956 via a database firewall 948 and a database switch 952.

Figure 9B:
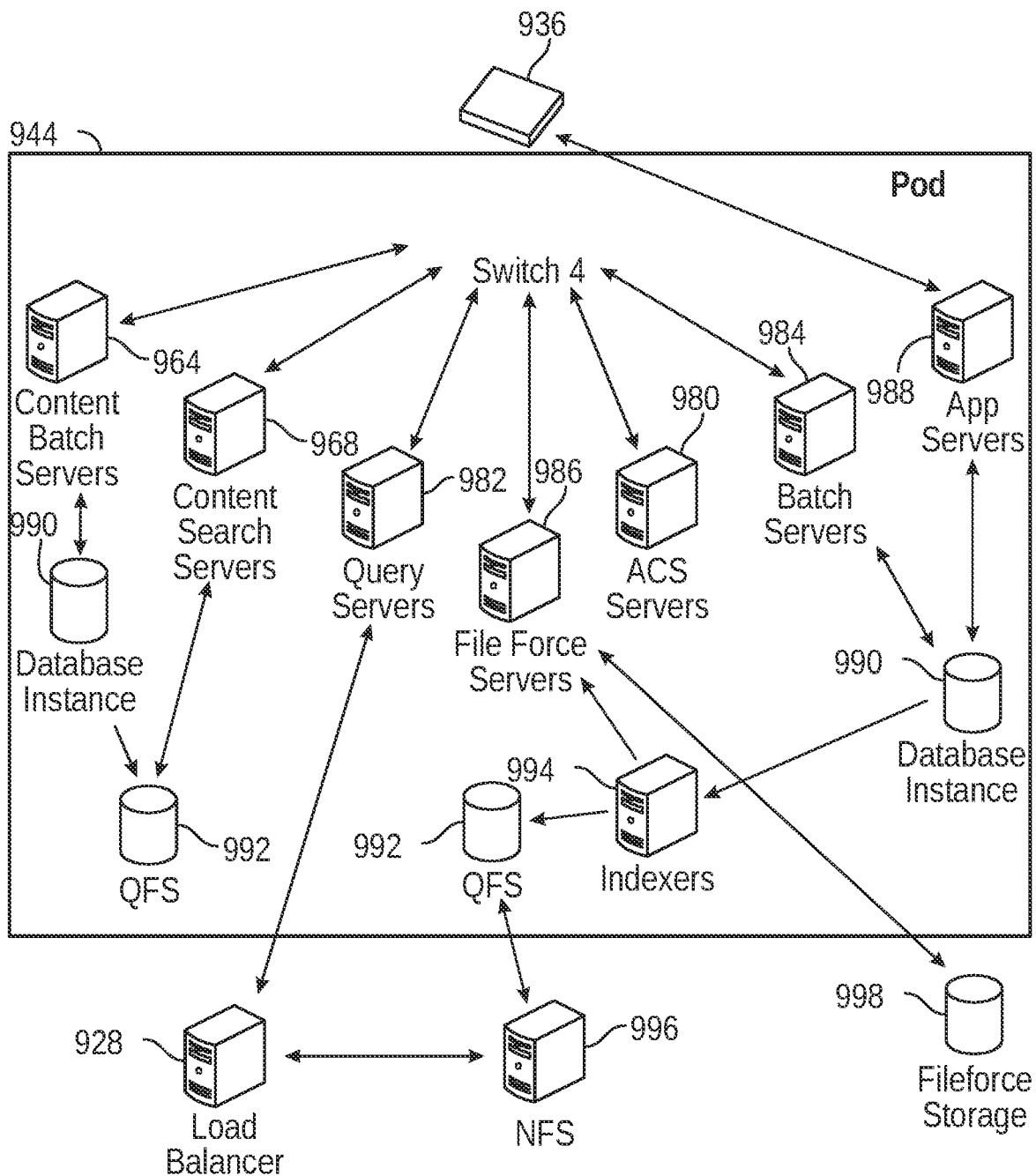
FIG. 9B shows a system diagram further illustrating architectural components of an applicable environment, in accordance with some embodiments.

As shown in FIGS. 9A and 9B, accessing an on-demand service environment may involve communications transmitted among a variety of different hardware and/or software components. Further, the on-demand service environment 900 is a simplified representation of an actual on-demand service environment. For example, while only one or two devices of each type are shown in FIGS. 9A and 9B, some embodiments of an on-demand service environment may include anywhere from one too many devices of each type. Also, the on-demand service environment need not include each device shown in FIGS. 9A and 9B, or may include additional devices not shown in FIGS. 9A and 9B.

Moreover, one or more of the devices in the on-demand service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or plurality of data networks, often including the Internet. Client machines located in the cloud 904 may communicate with the on-demand service environment to access services provided by the on-demand service environment. For example, client machines may access the on-demand service environment to retrieve, store, edit, and/or process information.

In some embodiments, the edge routers 908 and 912 route packets between the cloud 904 and other components of the on-demand service environment 900. The edge routers 908 and 912 may employ the Border Gateway Protocol (BGP). The BGP is the core routing protocol of the Internet. The edge routers 908 and 912 may maintain a table of IP networks or 'prefixes' which designate network reachability among autonomous systems on the Internet.

In one or more embodiments, the firewall 916 may protect the inner components of the on-demand service environment 900 from Internet traffic. The firewall 916 may block, permit, or deny access to the inner components of the on-demand service environment 900 based upon a set of rules and other criteria. The firewall 916 may act as one or more of a packet filter, an application gateway, a stateful filter, a proxy server, or any other type of firewall.

In some embodiments, the core switches 920 and 924 are high-capacity switches that transfer packets within the on-demand service environment 900. The core switches 920 and 924 may be configured as network bridges that quickly route data between different components within the on-demand service environment. In some embodiments, the use of two or more core switches 920 and 924 may provide redundancy and/or reduced latency.

In some embodiments, the pods 940 and 944 may perform the core data processing and service functions provided by the on-demand service environment. Each pod may include various types of hardware and/or software computing resources. An example of the pod architecture is discussed in greater detail with reference to FIG. 9B.

In some embodiments, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some embodiments, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some embodiments, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some embodiments, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some embodiments, communication with the database storage system 956 may be conducted via the database switch 952. The multi-tenant database system 956 may include more than one hardware and/or software components for handling database queries. Accordingly, the database switch 952 may direct database queries transmitted by other components of the on-demand service environment (e.g., the pods 940 and 944) to the correct components within the database storage system 956. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 13 and 14.

FIG. 9B shows a system diagram illustrating the architecture of the pod 944, in accordance with one embodiment. The pod 944 may be used to render services to a user of the on-demand service environment 900. In some embodiments, each pod may include a variety of servers and/or other systems. The pod 944 includes one or more content batch servers 964, content search servers 968, query servers 972, file force servers 976, access control system (ACS) servers 980, batch servers 984, and app servers 988. Also, the pod 944 includes database instances 990, quick file systems (QFS) 992, and indexers 994. In one or more embodiments, some or all communication between the servers in the pod 944 may be transmitted via the switch 936.

In some embodiments, the application servers 988 may include a hardware and/or software framework dedicated to the execution of procedures (e.g., programs, routines, scripts) for supporting the construction of applications provided by the on-demand service environment 900 via the pod 944. Some such procedures may include operations for providing the services described herein. The content batch servers 964 may requests internal to the pod. These requests may be long-running and/or not tied to a particular customer.

For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand service environment. The Fileforce servers 976 may manage requests information stored in the Fileforce storage 978. The Fileforce storage 978 may store information such as documents, images, and basic large objects (BLOBs). By managing requests for information using the Fileforce servers 976, the image footprint on the database may be reduced.

The query servers 972 may be used to retrieve information from one or more file systems. For example, the query system 972 may receive requests for information from the app servers 988 and then transmit information queries to the NFS 996 located outside the pod. The pod 944 may share a database instance 990 configured as a multi-tenant environment in which different organizations share access to the same database. Additionally, services rendered by the pod 944 may require various hardware and/or software resources. In some embodiments, the ACS servers 980 may control access to data, hardware resources, or software resources.

In some embodiments, the batch servers 984 may process batch jobs, which are used to run tasks at specified times. Thus, the batch servers 984 may transmit instructions to other servers, such as the app servers 988, to trigger the batch jobs. In some embodiments, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some embodiments, one or more query servers 972 may communicate with the NFS 996 to retrieve and/or update information stored outside of the pod 944. The NFS 996 may allow servers located in the pod 944 to access information to access files over a network in a manner similar to how local storage is accessed. In some embodiments, queries from the query servers 922 may be transmitted to the NFS 996 via the load balancer 920, which may distribute resource requests over various resources available in the on-demand service environment. The NFS 996 may also communicate with the QFS 992 to update the information stored on the NFS 996 and/or to provide information to the QFS 992 for use by servers located within the pod 944.

In some embodiments, the pod may include one or more database instances 990. The database instance 990 may transmit information to the QFS 992. When information is transmitted to the QFS, it may be available for use by servers within the pod 944 without requiring an additional database call. In some embodiments, database information may be transmitted to the indexer 994. Indexer 994 may provide an index of information available in the database 990 and/or QFS 992. The index information may be provided to file force servers 976 and/or the QFS 992.

Figure 10:
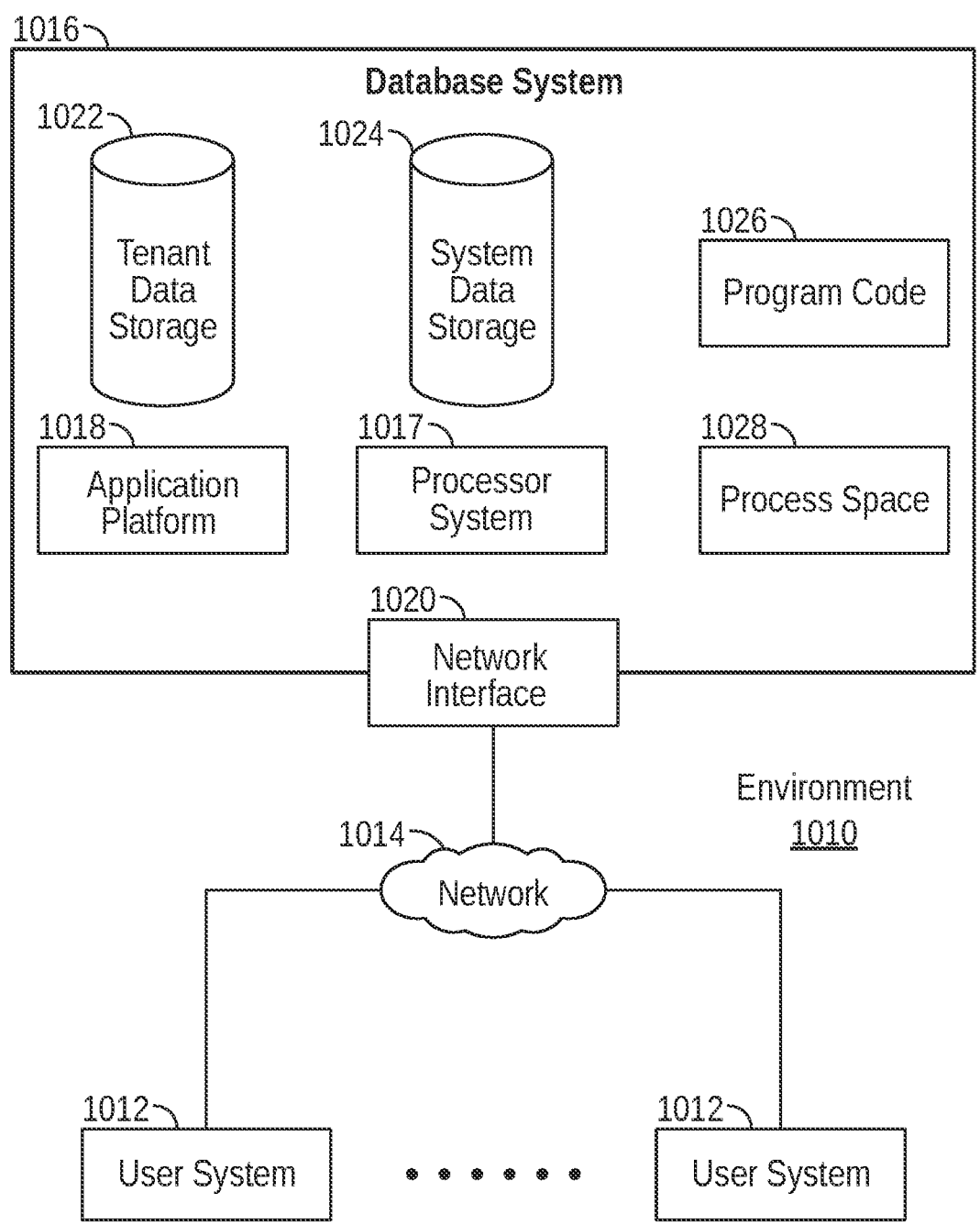
FIG. 10 shows a system diagram illustrating the architecture of a multitenant database environment, in accordance with some embodiments.
Figure 11:
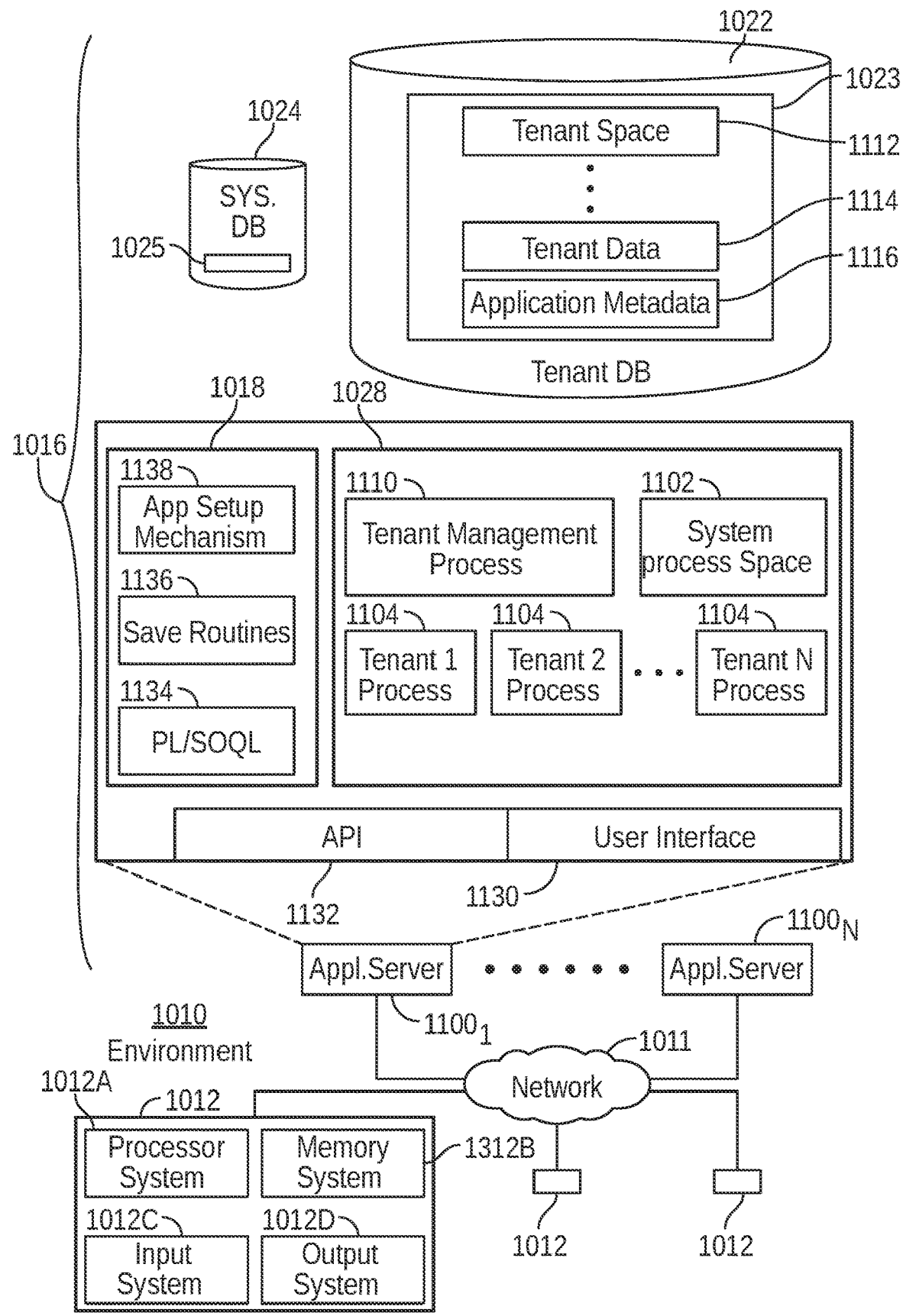
FIG. 11 shows a system diagram further illustrating the architecture of a multi-tenant database environment, in accordance with some embodiments.

FIG. 10 shows a block diagram of an environment 1010 wherein an on-demand database service might be used, in accordance with some embodiments. Environment 1010 includes an on-demand database service 1016. User system 1012 may be any machine or system that is used by a user to access a database user system. For example, any of user systems 1012 can be a handheld computing system, a mobile phone, a laptop computer, a workstation, and/or a network of computing systems. As illustrated in FIGS. 10 and 11, user systems 1012 might interact via a network 1014 with the on-demand database service 1016.

An on-demand database service, such as system 1016, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1016" and "system 1016" will be used interchangeably herein. A database image may include one or more database objects. A relational database management system (RDBMS) or the equivalent may execute storage and retrieval of information against the database object(s). Application platform 1018 may be a framework that allows the applications of system 1016 to run, such as the hardware and/or software, e.g., the operating system. In an implementation, on-demand database service 1016 may include an application platform 1018 that enables creation, managing and executing one or more applications developed by the provider of the on-demand database service, users accessing the on-demand database service via user systems 1012, or third party application developers accessing the on-demand database service via user systems 1012.

One arrangement for elements of system 1016 is shown in FIG. 10, including a network interface 1020, application platform 1018, tenant data storage 1022 for tenant data 1023, system data storage 1024 for system data 1025 accessible to system 1016 and possibly multiple tenants, program code 1026 for implementing various functions of system 1016, and a process space 1028 for executing MTS system processes and tenant-specific processes, such as running applications as part of an application hosting service. Additional processes that may execute on system 1016 include database indexing processes.

The users of user systems 1012 may differ in their respective capacities, and the capacity of a particular user system 1012 might be entirely determined by permissions (permission levels) for the current user. For example, where a call center agent is using a particular user system 1012 to interact with system 1016, the user system 1012 has the capacities allotted to that call center agent. However, while an administrator is using that user system to interact with system 1016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 1014 is any network or combination of networks of devices that communicate with one another. For example, network 1014 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 1012 might communicate with system 1016 using TCP/IP and, at a higher network level, use other common Internet protocols to communicate, such as HTTP, FTP, AFS, WAP, etc. In an example where HTTP is used, user system 1012 might include an HTTP client commonly referred to as a "browser" for sending and receiving HTTP messages to and from an HTTP server at system 1016. Such an HTTP server might be implemented as the sole network interface between system 1016 and network 1014, but other techniques might be used as well or instead. In some embodiments, the interface between system 1016 and network 1014 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 1016, shown in FIG. 10, implements a web-based customer relationship management (CRM) system. For example, in some embodiments, system 1016 includes application servers configured to implement and execute CRM software applications as well as provide related data, code, forms, web pages and other information to and from user systems 1012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1016 implements applications other than, or in addition to, a CRM application. For example, system 1016 may provide tenant access to multiple hosted (standard and custom) applications. User (or third party developer) applications, which may or may not include CRM, may be supported by the application platform 1018, which manages creation, storage of the applications into one or more database objects and executing of the applications in a virtual machine in the process space of the system 1016.

Each user system 1012 could include a desktop personal computer, workstation, laptop, PDA, cell phone, or any wireless access protocol (WAP) enabled device or any other computing system capable of interfacing directly or indirectly to the Internet or other network connection. User system 1012 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 1012 to access, process and view information, pages and applications available to it from system 1016 over network 1014.

Each user system 1012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1016 or other systems or servers. For example, the user interface device can be used to access data and applications hosted by system 1016, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 1012 and all of its components are operator configurable using applications, such as a browser, including computer code run using a central processing unit such as an Intel Pentium® processor or the like. Similarly, system 1016 (and additional instances of an MTS, where more than one is present) and all of their components might be operator configurable using application(s) including computer code to run using a central processing unit such as processor system 1017, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 1016 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 1016 is configured to provide web pages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 11 also shows a block diagram of environment 1010 further illustrating system 1016 and various interconnections, in accordance with some embodiments. FIG. 11 shows that user system 1012 may include processor system 1012A, memory system 1012B, input system 1012C, and output system 1012D. FIG. 11 shows network 1014 and system 1016. FIG. 11 also shows that system 1016 may include tenant data storage 1022, tenant data 1023, system data storage 1024, system data 1025, User Interface (UI) 1130, Application Program Interface (API) 1132, PL/SOQL 1134, save routines 1136, application setup mechanism 1138, applications servers 11001-1100N, system process space 1102, tenant process spaces 1104, tenant management process space 1110, tenant storage area 1112, user storage 1114, and application metadata 1116. In other embodiments, environment 1010 may not have the same elements as those listed above and/or may have other elements instead of, or in addition to, those listed above.

User system 1012, network 1014, system 1016, tenant data storage 1022, and system data storage 1024 were discussed above in FIG. 10. Regarding user system 1012, processor system 1012A may be any combination of processors. Memory system 1012B may be any combination of one or more memory devices, short term, and/or long-term memory. Input system 1012C may be any combination of input devices, such as keyboards, mice, trackballs, scanners, cameras, and/or interfaces to networks. Output system 1012D may be any combination of output devices, such as monitors, printers, and/or interfaces to networks. As shown by FIG. 11, system 1016 may include a network interface 1020 (of FIG. 10) implemented as a set of HTTP application servers 1100, an application platform 1018, tenant data storage 1022, and system data storage 1024. Also shown is system process space 1102, including individual tenant process spaces 1104 and a tenant management process space 1110. Each application server 1100 may be configured to tenant data storage 1022 and the tenant data 1023 therein, and system data storage 1024 and the system data 1025 therein to serve requests of user systems 1012. The tenant data 1023 might be divided into individual tenant storage areas 1112, which can be either a physical arrangement and/or a logical arrangement of data. Within each tenant storage area 1112, user storage 1114 and application metadata 1116 might be similarly allocated for each user. For example, a copy of a user's most recently used (MRU) items might be stored to user storage 1114. Similarly, a copy of MRU items for an entire organization that is a tenant might be stored to tenant storage area 1112. A UI 1130 provides a user interface and an API 1132 provides an application programmer interface to system 1016 resident processes to users and/or developers at user systems 1012. The tenant data and the system data may be stored in various databases, such as Oracle™ databases.

Application platform 1018 includes an application setup mechanism 1138 that supports application developers' creation and management of applications, which may be saved as metadata into tenant data storage 1022 by save routines 1136 for execution by subscribers as tenant process spaces 1104 managed by tenant management process 1110 for example. Invocations to such applications may be coded using PL/SOQL 34 that provides a programming language style interface extension to API 1132. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1116 for the subscriber making the invocation and executing the metadata as an application in a virtual machine.

Each application server 1100 may be communicably coupled to database systems, e.g., having access to system data 1025 and tenant data 1023, via a different network connection. For example, one application server $1100_1$ might be coupled via the network 1011 (e.g., the Internet), another application server $1100_{N-1}$ might be coupled via a direct network link, and another application server $1100_N$ might be coupled by yet a different network connection. Transfer Control Protocol and Internet Protocol (TCP/IP) are typical protocols for communicating between application servers 1100 and the database system. However, other transport protocols may be used to optimize the system depending on the network interconnect used.

In certain embodiments, each application server 1100 is configured to handle requests for any user associated with any organization that is a tenant. Because it is desirable to be able to add and remove application servers from the server pool at any time for any reason, there is preferably no server affinity for a user and/or organization to a specific application server 1100. In some embodiments, therefore, an interface system implementing a load balancing function (e.g., an F5 Big-IP load balancer) is communicably coupled between the application servers 1100 and the user systems 1012 to distribute requests to the application servers 1100. In some embodiments, the load balancer uses a least connections algorithm to route user requests to the application servers 1100. Other examples of load balancing algorithms, such as round robin and observed response time, also can be used. For example, in certain embodiments, three consecutive requests from the same user could hit three different application servers 1100, and three requests from different users could hit the same application server 1100. In this manner, system 1016 is multi-tenant, wherein system 1016 handles storage of, and access to, different objects, data and applications across disparate users and organizations.

As an example of storage, one tenant might be a company that employs a sales force where each call center agent uses system 1016 to manage their sales process. Thus, a user might maintain contact data, leads data, customer follow-up data, performance data, goals and progress data, etc., all applicable to that user's personal sales process (e.g., in tenant data storage 1022). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1016 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1016 might also maintain system level data usable by multiple tenants or other data. Such system level data might include industry reports, news, postings, and the like that are sharable among tenants.

In certain embodiments, user systems 1012 (which may be client machines/systems) communicate with application servers 1100 to request and update system-level and tenant-level data from system 1016 that may require sending one or more queries to tenant data storage 1022 and/or system data storage 1024. System 1016 (e.g., an application server 1100 in system 1016) automatically generates one or more SQL statements (e.g., SQL queries) that are designed to access the desired information. System data storage 1024 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method for securing client data natively on a database using key agreement, the database being stored on a database server, the method comprising:

receiving, by a security module running on the database server, a request over a network channel from a client application to store data from a client device, the client application being associated with a tenant identifier;

generating, by the security module in response to receiving the request to store data, a private key-public key pair;

transmitting, over the network channel by the security module, a request to derive a symmetric key from a key server, the request for the symmetric key comprising the public key, the public key being stored in a data store otherwise inaccessible by the key server and being associated by the security module with the tenant identifier;

receiving, in response to the request to derive the symmetric key, by the security module, an identifier for the private key managed by the key server, wherein the identifier includes a key identifier and a key version identifier;

receiving, by the security module, the symmetric key from the key server via the network channel, the symmetric key being generated by the key server based on the public key and a private key managed by the key server, the private key managed by the key server being accessible by the key server and not accessible by the database server, the symmetric key being derived using a key derivation function;

encrypting, by the security module, the data received from the client device using the symmetric key; and storing, in the database server, metadata associated with the data encrypted using the symmetric key, the metadata comprising: i) the public key associated with the tenant identifier, and ii) the identifier for the private key managed by the key server.

2. The method of claim 1, wherein both the public key associated with the tenant identifier and the private key managed by the key server correspond to different points on an elliptic curve.

3. The method of claim 1, wherein the public key associated with the tenant identifier and the private key managed by the key server are components of an elliptic curve Diffie-Hellman key exchange.

4. The method of claim 1, the symmetric key being assigned to the client device, the database server encrypting and storing data for a plurality of different tenants, the method further comprising encrypting, by the security module, subsequent data received from the client device using the symmetric key.

5. The method of claim 4, wherein each tenant has data stored on the database server in distinct extents, fragments of each extent being encrypted using the same symmetric key.

6. The method of claim 1, where the symmetric key is stored in an in-memory cache of the database server, and is destroyed after encryption is complete.

7. The method of claim 1, further comprising decrypting, by the security module, the encrypted data received from the client device by: identifying, by the security module, the public key and the identifier for the private key managed by the key server from the metadata associated with the data encrypted using the symmetric key;

transmitting, by the security module, a request for a regenerated symmetric key to the key server via the network channel, the request for the regenerated symmetric key comprising the public key and the identifier for the private key managed by the key server;

receiving, by the security module, the regenerated symmetric key from the key server via the network channel, the regenerated symmetric key being generated by the key server based on the public key and the private key managed by the key sever, the regenerated symmetric key being derived using the key derivation function;

and decrypting, by the security module, the encrypted data received from the client device using the regenerated symmetric key.

8. The method of claim 1, wherein the key derivation function applies a cryptographic hash function to a key agreement key and a salt value, the key agreement key being generated using a key agreement protocol applied to the public key and the private key managed by the key server associated with the identifier.

9. The method of claim 1, further comprising creating, by the security module, the tenant identifier in response to receiving a request to utilize the database from the client application over the network channel.

10. An apparatus for securing client data natively on a database using key agreement, the database being stored on a database server, the apparatus comprising: one or more processors of a database server; and a non-transitory computer readable medium storing a plurality of instructions, which when executed, cause the one or more processors to:
receive a request over a network channel from a client application to store data from a client device, the client application being associated with a tenant identifier;
generate a private key-public key pair in response to receiving the request to store data;
transmit, to a key server, a request to derive a symmetric key, the request for the symmetric key comprising the public key, the public key being stored in a data store otherwise inaccessible by the key server and being associated by a security module with the tenant identifier;
receiving, in response to the request to derive the symmetric key, by the security module, an identifier for the private key managed by the key server, wherein the identifier includes a key identifier and a version identifier;
receive the symmetric key from the key server over the network channel, the symmetric key being generated by the key server based on the public key and a private key managed by the key server, the private key managed by the key server being accessible by the key server and not accessible by the database server, the symmetric key being derived using a key derivation function;
store, in the database server, metadata associated with the data encrypted using the symmetric key, the metadata comprising: i) the public key associated with the tenant identifier, and ii) the identifier for the private key managed by the key server.

11. The apparatus of claim 10, wherein both the public key associated with the tenant identifier and the private key managed by the key server correspond to different points on an elliptic curve.

12. The apparatus of claim 10, wherein the plurality of instructions, when executed, further cause the one or more processors to decrypt the encrypted data received from the client device by:
identifying the public key and the identifier for the private key managed by the key server from the metadata associated with the data encrypted using the symmetric key;
transmitting a request for a regenerated symmetric key to the security key server via the network channel, the request for the regenerated symmetric key comprising the public key and the identifier for the private key managed by the key server;
receiving the regenerated symmetric key from the key server via the network channel, the regenerated symmetric key being generated by the key server based on the public key and the private key managed by the key server, the regenerated symmetric key being derived using the key derivation function; and
decrypting the encrypted data received from the client device using the regenerated symmetric key.

13. The apparatus of claim 10, the symmetric key being assigned to the client device, the database server encrypting and storing data for a plurality of different tenants, wherein the plurality of instructions, when executed, further cause the one or more processors to encrypt subsequent data received from the client device using the symmetric key.

14. The apparatus of claim 13, wherein each tenant has data stored on the database system in distinct extents, fragments of each extent being encrypted using the same symmetric key.

15. A hardware computer program product for securing client data natively on a database using key agreement, the database being stored on a database server, the computer program product comprising computer-readable program code to be executed by one or more processors when retrieved from a non-transitory computer-readable medium, the program code including instructions to:
receive a request over a network channel from a client application to store data from a client device, the client application being associated with a tenant identifier;
generate a private key-public key pair in response to receiving the request to store data;
transmit, to a key server, a request to derive a symmetric key, the request for the symmetric key comprising the public key, the public key being stored in a data store otherwise inaccessible by the key server and being associated by a security module with the tenant identifier;
receiving, in response to the request to derive the symmetric key, by the security module, an identifier for the private key managed by the key server, wherein the identifier includes a key identifier and a version identifier;
receive the symmetric key from the key server over the network channel, the symmetric key being generated by the key server based on the public key and a private key managed by the key server, the private key managed by the key server being accessible by the key server and not accessible by the database server, the symmetric key being derived using a key derivation function;
encrypt the data received from the client device using the symmetric key; and store, in the database server, metadata associated with the data encrypted using the symmetric key, the metadata comprising: i) the public key associated with the tenant identifier, and ii) the identifier for the private key managed by the key server.

16. The computer program product of claim 15, wherein both the public key associated with the tenant identifier and the private key managed by the key server correspond to different points on an elliptic curve.

17. The computer program product of claim 15, the program code including further instructions to decrypt the encrypted data received from the client device by: identifying the public key and the identifier for the private key managed by the key server from the metadata associated with the data encrypted using the symmetric key;
transmitting a request for a regenerated symmetric key to the security key server via the network channel, the request for the regenerated symmetric key comprising the public key and the identifier for the private key managed by the key server;

receiving the regenerated symmetric key from the key server via the network channel, the regenerated symmetric key being generated by the key server based on the public key and the private key managed by the key sever, the regenerated symmetric key being derived using the key derivation function; and decrypting the encrypted data received from the client device using the regenerated symmetric key.

18. The computer program product of claim 15, the symmetric key being assigned to the client device, the database server encrypting and storing data for a plurality of different tenants, the program code including further instructions to encrypt subsequent data received from the client device using the symmetric key.

19. The computer program product of claim 18, wherein each tenant has data stored on the database system in distinct extents, the fragments of each extent being encrypted using the same symmetric key.

20. The computer program product of claim 15, where the symmetric key is stored in an in-memory cache of the database server, the program code including further instructions to delete the symmetric key after encryption is complete.

* * * * *